United States Patent
Cobzaru et al.

(10) Patent No.: US 12,330,248 B2
(45) Date of Patent: Jun. 17, 2025

(54) TWO-PIECE BLIND FASTENER AND INSTALLATION TOOL

(71) Applicant: SPS TECHNOLOGIES, LLC, Jenkintown, PA (US)

(72) Inventors: Cristinel Cobzaru, Murrieta, CA (US); Brian Hoffarth, Santa Ana, CA (US); Claude Couillandeau, Condrieu (FR)

(73) Assignee: SPS TECHNOLOGIES, LLC, Jenkintown, PA (US)

( * ) Notice: Subject to any disclaimer, the term of this patent is extended or adjusted under 35 U.S.C. 154(b) by 377 days.

(21) Appl. No.: 17/680,882

(22) Filed: Feb. 25, 2022

(65) Prior Publication Data

US 2022/0176438 A1 Jun. 9, 2022

Related U.S. Application Data

(63) Continuation of application No. PCT/US2020/047946, filed on Aug. 26, 2020.
(Continued)

(51) Int. Cl.
*B23P 11/00* (2006.01)
*B21J 15/04* (2006.01)
(Continued)

(52) U.S. Cl.
CPC ........... *B23P 11/005* (2013.01); *B21J 15/043* (2013.01); *B21J 15/105* (2013.01); *B21J 15/26* (2013.01);
(Continued)

(58) Field of Classification Search
CPC ........ B21J 15/043; B21J 15/105; B21J 15/26; F16B 5/045; F16B 19/1054; F16B 19/1072
See application file for complete search history.

(56) References Cited

U.S. PATENT DOCUMENTS

| | | |
|---|---|---|
| 4,368,631 A | 1/1983 | Tanikawa |
| 2019/0048913 A1* | 2/2019 | Rosenberg .......... F16B 19/1072 |

(Continued)

FOREIGN PATENT DOCUMENTS

| | | |
|---|---|---|
| EP | 1635994 | 3/2006 |
| JP | H0544343 | 6/1993 |

(Continued)

OTHER PUBLICATIONS

International Search Report for corresponding International Application PCT/US2020/047946, mailed Oct. 23, 2020.
(Continued)

*Primary Examiner* — Mohammed S. Alawadi
(74) *Attorney, Agent, or Firm* — Burris Law, PLLC

(57) ABSTRACT

A blind fastener for connecting workpieces includes a bolt and nut. The bolt includes a shaft, bolt head, and lug. The bolt head is between the shaft and lug and extends radially outward from the shaft. The shaft defines external threads opposite the bolt head. The lug includes a first tool engagement portion and a first frangible portion that frangibly couples the lug to the bolt head. The nut includes a sleeve, nut head, and handling member. The shaft is threadably received in the sleeve. The nut head extends radially outward from the sleeve and defines a recess that receives the bolt head. The handling member surrounds at least a portion of the lug. The handling member includes a second frangible portion and a second tool engagement portion. The second frangible portion frangibly couples the second tool engagement portion to the nut head.

14 Claims, 12 Drawing Sheets

Related U.S. Application Data

(60) Provisional application No. 62/891,678, filed on Aug. 26, 2019.

(51) Int. Cl.
| | |
|---|---|
| *B21J 15/10* | (2006.01) |
| *B21J 15/26* | (2006.01) |
| *B25B 27/00* | (2006.01) |
| *F16B 5/04* | (2006.01) |
| *F16B 19/10* | (2006.01) |

(52) U.S. Cl.
CPC .......... *B25B 27/0014* (2013.01); *F16B 5/045* (2013.01); *F16B 19/1054* (2013.01); *F16B 19/1072* (2013.01)

(56) References Cited

U.S. PATENT DOCUMENTS

| | | |
|---|---|---|
| 2019/0160520 A1 | 5/2019 | Cobzaru |
| 2019/0162217 A1 | 5/2019 | Vovan |
| 2020/0139425 A1* | 5/2020 | Auriol ...................... B21J 15/28 |

FOREIGN PATENT DOCUMENTS

| | | |
|---|---|---|
| WO | 2004104429 | 12/2004 |
| WO | 2018224793 | 12/2018 |

OTHER PUBLICATIONS

European Search Report received in corresponding EP Application 24169713.5, mailed Jun. 25, 2024, 3 pages.

* cited by examiner

TWO-PIECE BLIND FASTENER AND INSTALLATION TOOL

CROSS-REFERENCE TO RELATED APPLICATIONS

This application is a continuation of International Application No. PCT/US2020/047946, filed Aug. 26, 2020, which claims priority to and the benefit of U.S. Provisional Application No. 62/891,678, filed on Aug. 26, 2019. The disclosures of the above applications are incorporated herein by reference.

FIELD

The present disclosure relates generally to fasteners and more particularly to blind fasteners having a core bolt and a nut around the core bolt for connecting panels from one side of the panels.

BACKGROUND

The statements in this section merely provide background information related to the present disclosure and may not constitute prior art.

A blind fastener is typically used to secure multiple panels together and to be installed from one side (i.e., a front side) of the panels. The blind fastener may include a core bolt and a sleeve surrounding the core bolt, which are inserted into a hole of the panels. A portion of the sleeve adjacent to a rear side of the panel may be deformed during installation of the fastener. The deformed portion of the sleeve provides a bearing surface to induce preload in the fastener such that the panels can be clamped together.

After the deformed portion of the sleeve is formed, the core bolt may be rotated to provide a preload to the fastener. When the fastener is completely installed, a front portion of the core bolt may break off. The break-off point of the typical core bolt cannot be controlled and rotation of the nut relative to the bolt typically needs to be controlled. In some circumstances it is advantageous to have the fully installed fastener be flush with panels for aesthetics and aerodynamic purposes. Typical fasteners need to be prepared for painting by post-installation grinding to be made flush with the panels when the break-off point is located outside the countersunk head of the sleeve.

It can be difficult to control rotation of both the bolt and the nut, while also ensuring a flush finished product, maximizing the speed of installation, and reducing cost per fastener. Furthermore, variations in grip length (i.e., the combined thickness of the panels at the fastener) can occur based on tolerances or design criteria. Accordingly, it is advantageous for the blind fastener to be able to adapt to variations in grip length without sacrificing strength of the joint. Moreover, the typical fastener does not include a torque control feature. When excessive torque is applied to the fastener, the sleeve of the fastener may flare out to form a tulip configuration, resulting in a defective installation.

These issues related to the installation of blind fasteners are addressed by the present disclosure.

SUMMARY

In one form, a blind fastener for connecting a plurality of workpieces includes a bolt and a nut. The bolt includes a shaft, a bolt head, and a lug. The bolt head is disposed between the shaft and the lug and extends radially outward from the shaft. An end of the shaft opposite the bolt head defines external threads. The lug includes a first tool engagement portion and a first frangible portion that frangibly couples the lug to the bolt head. The nut includes a sleeve, a nut head, and a handling member. The sleeve includes a central bore configured to receive the shaft and defines internal threads configured to mate with the external threads. The nut head is disposed between the handling member and the sleeve. The nut head extends radially outward from the sleeve and defines a recess configured to receive the bolt head. The handling member is configured to surround at least a portion of the lug. The handling member includes a second frangible portion and a second tool engagement portion. The second frangible portion frangibly couples the second tool engagement portion to the nut head. In a variety of alternate forms: an end surface of the bolt head is flush with or recessed from an end surface of the nut head when the bolt is fully threaded into the nut; the first frangible portion is configured to break off from the bolt head such that an end surface of the bolt head is flush with or recessed from a front surface of the plurality of workpieces, and the second frangible portion is configured to break off from the nut head such that an end surface of the nut head is flush with or recessed from the front surface; the first tool engagement portion includes lead-in ramps; the second tool engagement portion includes lead-in ramps; second frangible portion is entirely radially inward of an outermost perimeter of the nut head; the handling member defines a bore having a diameter equal to an outermost diameter of the recess; the lug includes a retaining lip and the handling member defines a bore having a diameter that is less than a diameter of the retaining lip; the retaining lip extends radially outward of the first tool engagement portion; the handling member is entirely radially outward of the first tool engagement portion; the blind fastener consists of two pieces when in a pre-installed condition, the bolt being a first one of the two pieces and the nut being a second one of the two pieces; the second frangible portion defines a break-neck that extends around a full circumference of the nut; the first frangible portion includes a break-neck that extends around a full circumference of the bolt; when the blind fastener is in a pre-installed condition, the sleeve includes a ductile zone that has a hardness that is less than a hardness of the nut head, a portion of the sleeve between the ductile zone and the nut head, and a portion of the sleeve at the internal threads; when the blind fastener is in a pre-installed condition, the sleeve includes a variable annealed zone that has a hardness that is less than a hardness of the nut head and less than a hardness of the portion including the internal threads.

According to another form, a tool for installing a blind fastener that includes a bolt and a nut includes a driving member, a collet, and a nosepiece. The collet is driven by the driving member for engaging the bolt. The nosepiece holds the nut and inhibits the nut from rotating during installation of the blind fastener. The nosepiece is movable between a first position in which the nosepiece is driven by the collet to rotate with the collet and a second position in which the nosepiece is rotationally stationary despite rotating action of the collet. According to a variety of alternate forms: the tool further includes a retaining sleeve and a follower, the retaining sleeve is disposed about the nosepiece and defines a cam and the follower is disposed between the retaining sleeve and the nosepiece such that rotation of the nosepiece relative to the retaining sleeve causes the cam to move the follower radially inward against a tool engagement portion of the nut; the tool further includes an ejector pin and a spring biasing the ejector pin toward an extended position relative to the collet; the tool further including a plurality of stationary lugs, wherein the nosepiece includes a plurality of rotary lugs configured to engage the stationary lugs when the collet is in the second position; each of the stationary lugs includes a ramped face and each of the rotary lugs includes a ramped face.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
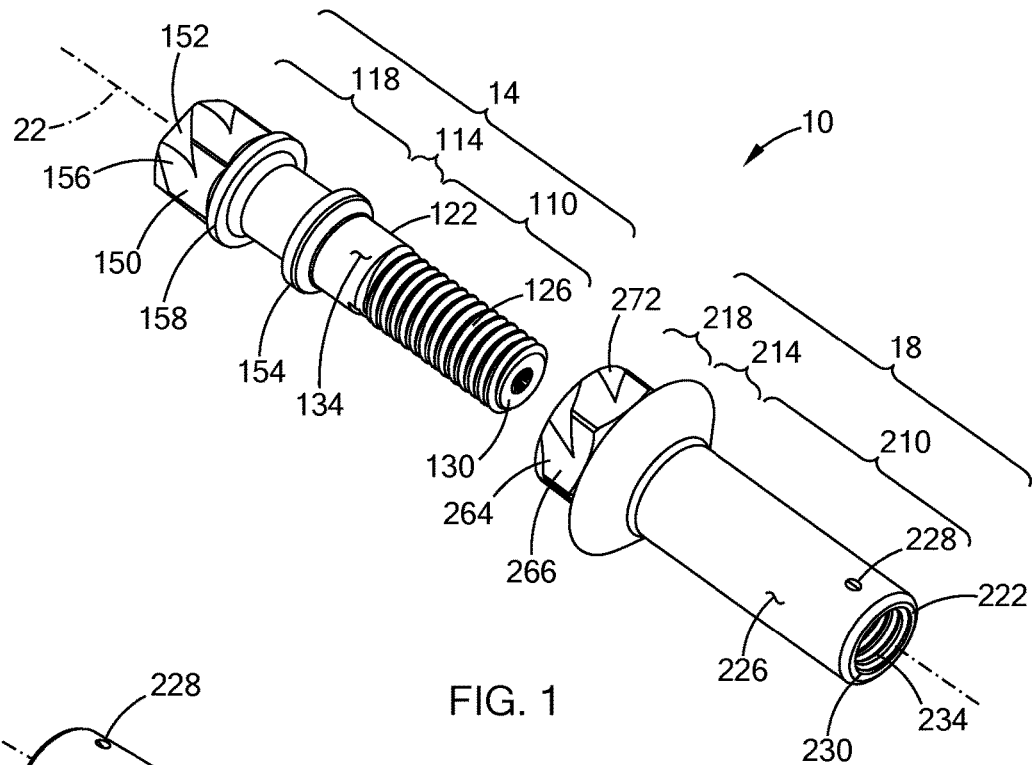
FIG. 1 is an exploded rear perspective view of a blind fastener in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Fastener Assembly

Figure 2:
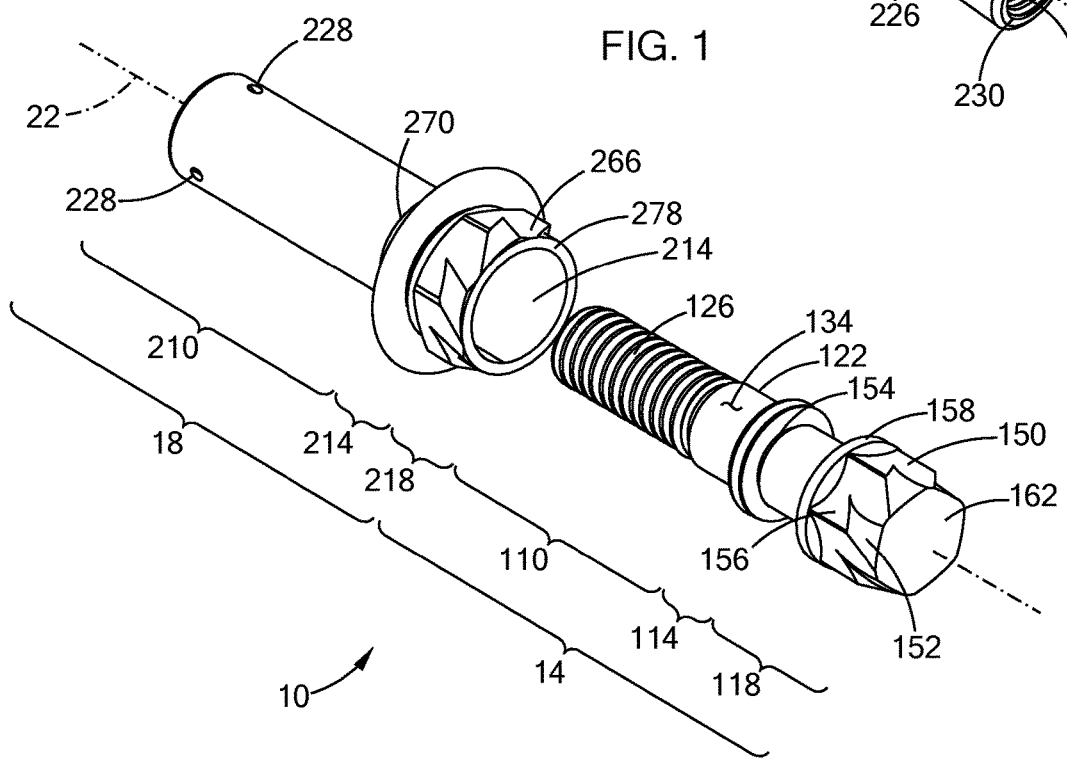
FIG. 2 is an exploded front perspective view of the blind fastener of FIG. 1.

Referring to FIGS. 1 and 2, a blind fastener 10 includes a bolt 14 and nut 18 that are configured to be matingly fitted together when positioned coaxially along a central axis 22. In the example provided, the bolt 14 is a single, integral piece of material and the nut 18 is a separate, single, integral piece of material. The bolt 14 and nut 18 can be formed from any suitable type of material such as a metal or alloy material for example. The bolt 14 can be formed of the same material as the nut 18 or can be a different suitable material. The blind fastener 10 can be similar to the blind fastener of U.S. patent application Ser. No. 16/201,775 (U.S. Pub. No. 2019/0162217, the entire disclosure of which is incorporated herein by reference) except as otherwise shown or described herein.

Figure 3:
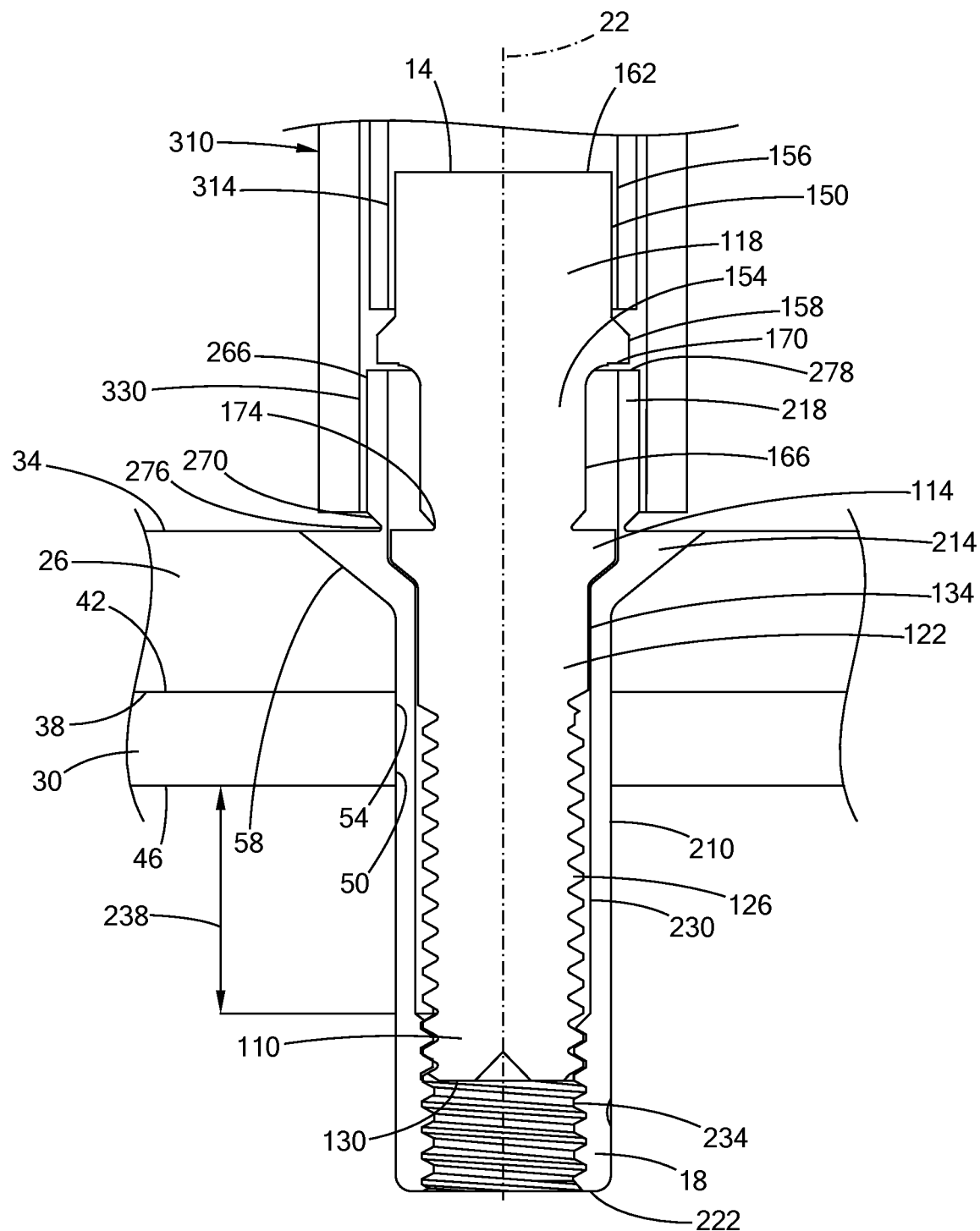
FIG. 3 is a cross-sectional view of the blind fastener of FIG. 1, illustrating the blind fastener in a pre-installed position relative to a set of workpieces.

With additional reference to FIG. 3, the blind fastener 10 secures a first workpiece 26 to a second workpiece 30. In an alternative form, not specifically shown, more than two workpieces can be secured together by the blind fastener 10. In the example provided, the workpieces 26, 30 are plates or panels formed of any suitable material, such as metal (e.g., aluminum), carbon fiber composite or other suitable material for a given application. The first workpiece 26 has a first front surface 34 and a first back surface 38. The second workpiece 30 can be a similar or a different material from the first workpiece 26. An appropriate sealing or barrier (not shown) may optionally be applied between the workpieces 26, 30 and/or between the workpieces 26, 30 and the blind fastener 10 to inhibit galvanic corrosion. The second workpiece 30 includes a second front surface 42 and a second back surface 46. The second front surface 42 faces the first back surface 38.

The first workpiece 26 and the second workpiece 30 each define apertures that cooperate when aligned to form an aperture 50 through the first front surface 34 and through the second back surface 46 that is coaxial with the axis 22. The aperture 50 can be countersunk or counter bored from the first front surface 34. In the example provided, the aperture 50 is counter sunk such that it includes a cylindrical inner bore 54 and a contact surface 58 that extends axially at an angle between the inner bore 54 and the first front surface 34.

The bolt 14 is formed from a single, integral piece of material and includes a shaft 110, a bolt head 114, and a lug 118 that are disposed about the axis 22. The shaft 110 is generally cylindrical and includes a stem 122 and a threaded portion that defines external threads 126. The external threads 126 begin at one terminal end 130 of the bolt 14. The stem 122 is disposed axially between the threads 126 and the bolt head 114.

In one form, the stem 122 has a generally smooth cylindrical first outer surface 134 with a diameter that is greater than or equal to the major diameter of the external threads 126. The external threads 126 extend axially along the shaft 110 until terminating adjacent to the stem 122, though other configurations can be used. In one alternative example, not shown, a sealant or a seal can be disposed between the termination of the external threads 126 and the stem 122 or can be disposed along the stem 122, to seal with the inner surface of the nut 18. The seal (not shown) is configured to inhibit passage of fluids, such as water, oil, fuel, etc. The seal (not shown) can be an elastomeric body, such as an o-ring for example.

The bolt head 114 is located at an end of the stem 122 that is opposite the external threads 126. The bolt head 114 extends radially outward of the first outer surface 134 of the stem 122.

Figure 4:
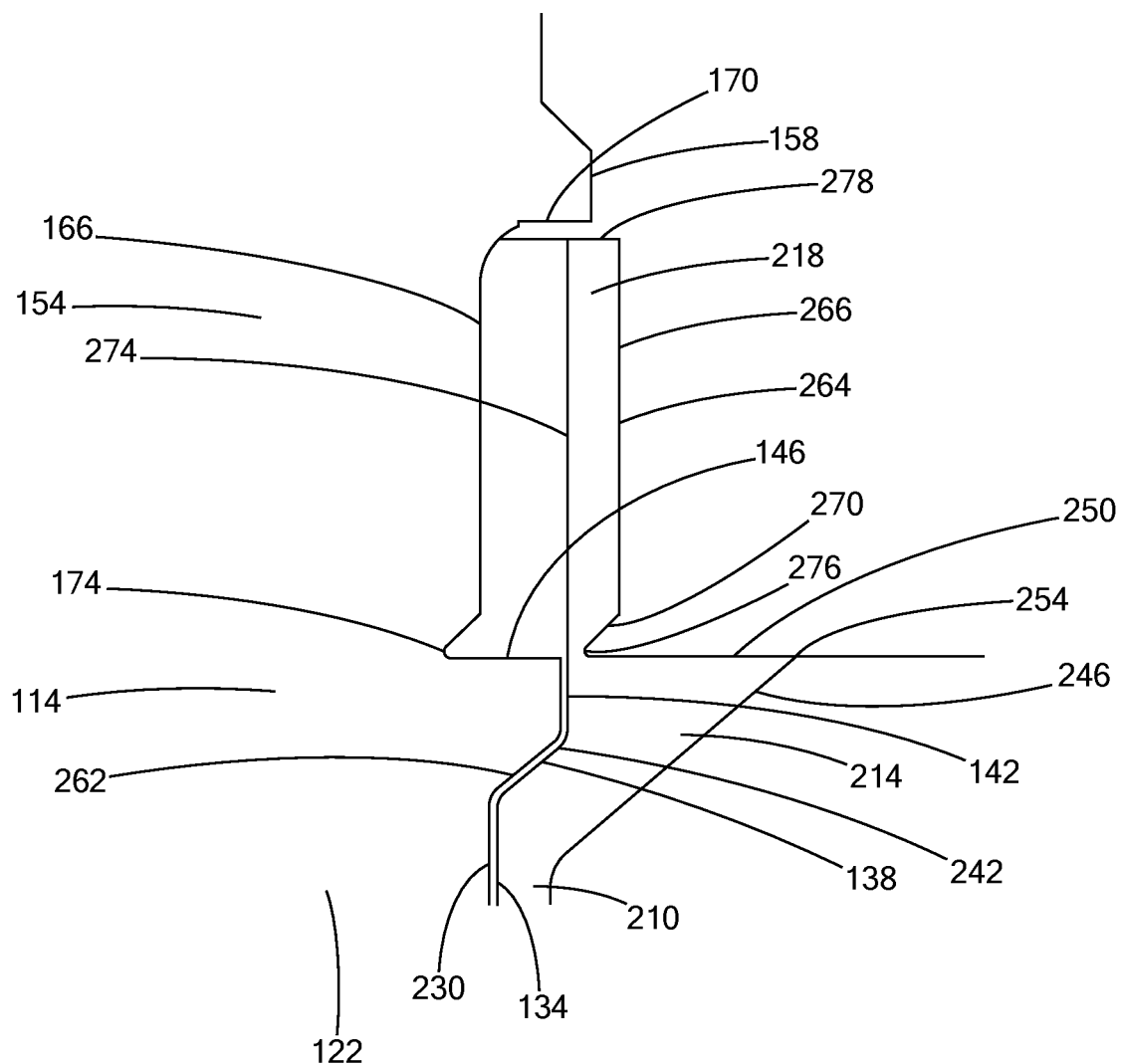
FIG. 4 is an enlarged cross-sectional detail view of a portion of the blind fastener of FIG. 1 in the pre-installed position.

Referring to FIG. 4, the bolt head 114 includes a clamp surface 138, a radially outermost perimeter 142, and a first end surface 146. The clamp surface 138 extends radially outward from the first outer surface 134 at an angle, though other configurations can be used. The perimeter 142 extends axially between the clamp surface 138 and the first end surface 146. In the example provided, the perimeter 142 is generally parallel with the axis 22, though other configurations can be used. The first end surface 146 faces axially away from the stem 122. In the example provided, the first end surface 146 is generally perpendicular to the axis 22, though other configurations can be used.

Returning generally to FIGS. 1 and 2, the lug 118 includes a first tool engagement portion 150 and a first frangible portion 154. In the example provided, the lug 118 can also include a rim or retainer lip 158 axially between the first tool engagement portion 150 and the first frangible portion 154. The first tool engagement portion 150 defines the other terminal end 162 of the bolt 14, opposite the external threads 126.

With specific reference to FIG. 3, the first tool engagement portion 150 is configured to be engaged by a tool 310 to impart torque about the axis 22. In the example provided, the first tool engagement portion 150 has a plurality of externally facing flat surfaces 156 that form a generally hexagonal shape and the tool 310 includes a first socket 314 that has a plurality of interior facing flat surfaces configured to engage the first tool engagement portion 150, although other shapes or configurations can be used, such as star, spline, or lobe shapes or other driving configurations. In an alternative form, not shown, the first tool engagement portion 150 can have a female tool engagement feature such as a recessed socket, while the tool 310 can have a mating male feature such as a male protrusion socket.

Returning to FIGS. 1 and 2, the tool engagement portion 150 may optionally also include angled lead-in ramps 152 that can guide the first socket 314 (FIG. 3) onto the tool engagement portion 150. Each lead-in ramp 152 starts at the terminal end 162 of the bolt 14 and cuts across a portion of adjacent flat surfaces 156 (e.g., a portion of each corner of the hexagonal shape). In the example provided, the external threads 126 of the bolt 14 are right-handed threads and, when viewed from the terminal end 162, the lead-in ramps 152 sweep in a clock-wise direction across the adjacent flat surfaces 156 and can sweep in an angled or helical manner until blending with the hexagonal shape.

The retainer lip 158 is axially between the first tool engagement portion 150 to the first frangible portion 154 and extends radially outward of the first tool engagement portion 150. In the example provided, the retainer lip 158 has a generally frustoconical shape that widens with increased distance from the first tool engagement portion 150.

Referring to FIG. 4, the perimeter of the retainer lip 158 is greater than the diameter of an outer surface 166 of the first frangible portion 154, such that the retainer lip 158 and outer surface 166 of the first frangible portion 154 form a shoulder 170. The retainer lip 158 can limit axial movement of the tool 310 (FIG. 3) toward the bolt head 114.

The first frangible portion 154 frangibly couples the retainer lip 158 to the bolt head 114. In the example provided, the outer surface 166 of the first frangible portion 154 is generally cylindrical in shape and has a diameter that is equal to or less than the outermost diameter of the perimeter 142 of the bolt head 114. The first frangible portion 154 narrows from the outer surface 166 to a break-neck 174 that joins the first end surface 146 of the bolt head 114 with the lug 118. In the example provided, the diameter of the break-neck 174 is also less than the diameter of the first outer surface 134 of the stem 122 and extends around a full circumference of the bolt 14.

Returning to FIGS. 1 and 2, the nut 18 in the example provided is formed from a single, integral piece of material and includes a sleeve 210, a nut head 214, and a handling member 218 disposed about the axis 22. The sleeve 210 is a generally cylindrical body having a second outer surface 226. One end of the sleeve 210 defines a terminal end 222 of the nut opposite the nut head 214. The sleeve 210 is received in the inner bore 54 (FIG. 3) of the first and second workpieces 26, 30 (FIG. 3).

The sleeve 210 defines a central bore 230 coaxial with the axis 22 and includes internal threads 234. Referring to FIG. 3, the internal threads 234 start at the terminal end 222 and extend axially toward the nut head 214 but terminate a predetermined distance from the second back surface 46. The internal threads 234 are configured to threadably engage the external threads 126 of the bolt 14. The first bore 230 has a diameter that is slightly greater than the diameter of the first outer surface 134 of the stem 122 so that the shaft 110 can be rotatably received in the first bore 230.

Referring to FIGS. 1 and 2, the sleeve 210 may also include one or more dimples 228 recessed radially inward from the second outer surface 226. The dimples 228 are proximate to the terminal end 222 and can be equally spaced in the circumferential direction about the sleeve 210. The dimples 228 protrude slightly into the first central bore 230 so that they extend radially inward of the major diameter of the internal threads 234 and provide an interference fit with the external threads 126. Thus, the dimples 228 can provide some minor resistance to rotation between the internal and external threads 234, 126.

Referring to FIG. 3, the sleeve 210 can include a ductile region 238 between internal threads 234 and the nut head 214. The ductile region has a hardness that is less than a hardness of the rest of the nut 18. In one form, the nut head 214, the region of the sleeve 210 that is surrounded by the first and second workpieces 26, 30, and the region of the sleeve 210 that includes the internal threads 234 has a first hardness value, while the ductile region 238 can have a significantly lower hardness value. This significantly lower hardness value can be achieved by band annealing the sleeve 210 for example.

The nut head 214 is located at an end of the sleeve 210 that is opposite the internal threads 234 and extends radially outward of the sleeve 210. Referring to FIG. 4, the nut head 214 includes a recess 242, a clamp surface 246, and a second end surface 250. The clamp surface 246 extends radially outward from the second outer surface 226 of the sleeve 210 at an angle, though other configurations can be used. A perimeter 254 of the nut head 214 is defined by the junction of the clamp surface 246 and the second end surface 250. The second end surface 250 faces axially away from the sleeve 210 and can be generally perpendicular to the axis 22, though other configurations can be used.

One end of the recess 242 is open through the second end surface 250 and the other end of the recess 242 is open to the first bore 230. The recess 242 is disposed coaxially with the axis 22 and configured to receive the bolt head 114. The recess 242 has an inner wall surface 258 and a contact surface 262. The contact surface 262 extends radially outward from the first bore 230 at an angle to the inner wall surface 258. In the example provided, the inner wall surface 258 is generally cylindrical and extends axially between the contact surface 262 and the handling member 218. The inner wall surface 258 has a diameter that is greater than the diameter of the perimeter 142 of the bolt head 114 so that the bolt head 114 can be rotatably received in the recess 242.

The contact surface 262 of the nut head 214 is at an angle similar to the angle of the clamp surface 138 of the bolt head 114. The inner wall surface 258 of the nut head 214 meets the contact surface 262 at a depth from the second end surface 250 such that when the bolt head 114 is received in the recess 242 the first end surface 146 of the bolt head 114 is flush with or recessed from the second end surface 250 of the nut head 214.

The handling member 218 includes a second tool engagement portion 266 and a second frangible portion 270 disposed about the axis 22. The handling member 218 defines a second bore 274 coaxial with the axis 22 and open through the terminal end 278 of the nut 18 and open to the recess 242. The second bore 274 surrounds at least a portion of the first frangible portion 154. In the example provided, the second bore 274 has a diameter less than the diameter of the retainer lip 158 of the lug 118, though other configurations can be used. In the example provided, the second bore 274 has the same diameter as the inner wall surface 258 of the nut head 214 such that the second bore 274 and inner wall surface 258 can be formed as a single bore.

The second tool engagement portion 266 is configured to be engaged by the tool 310 (FIG. 3) to impart torque about the axis 22. In the example provided, the second tool engagement portion 266 has a plurality of externally facing flat surfaces 264 that form a hexagonal shape and the tool 310 (FIG. 3) includes a second socket 330 (FIG. 3) that has a plurality of interior facing flat surfaces configured to engage the hexagonal shape of the second tool engagement portion 266, though other shapes or configurations can be used, such as star, spline, or lobe shapes or other driving configurations. In the example provided, the second tool engagement portion 266 is entirely radially inward of the perimeter 254 of the nut head 214.

Returning to FIGS. 1 and 2, the second tool engagement portion 266 may optionally also include angled lead-in ramps 272 that can guide the second socket 330 (FIG. 3) onto the second tool engagement portion 266. Each lead-in ramp 272 starts at the terminal end 278 of the nut 18 and cuts across a portion of adjacent flat surfaces 264 (e.g., a portion of each corner of the hexagonal shape). In the example provided, when viewed from the terminal end 278, the lead-in ramps 272 sweep in a clockwise direction across the adjacent flat surfaces 264 and can sweep in an angled or helical manner until blending with the hexagonal shape.

Returning to FIG. 4, the second frangible portion 270 frangibly couples the second tool engagement portion 266 to the nut head 214. In the example provided, the inner surface of the second frangible portion 270 is defined by the second bore 274 and an outer surface of the second frangible portion 270 narrows from the second tool engagement portion 266 to define a break-neck 276. Thus, the handling member 218 has a minimum wall thickness about the axis 22 at a location where the second frangible portion 270 meets the nut head 214. In the example provided, the break-neck 276 extends around a full circumference of the nut 18.

In an alternative form, the handling member 218 can be a part that is formed separately from the rest of the nut 18 (i.e., the sleeve 210 and the nut head 214). In this alternative form, the handling member 218 can be attached to the nut head 214 such as by glue, adhesive, welding, or brazing for example. In this alternative form, the frangible portion 270 is formed by the glue, adhesive, weld, or braze. This alternative form may still narrow to a neck (similar to break-neck 276) at the frangible portion 270 or may not narrow depending on the strength of the glue, adhesive, weld, or braze.

Installation

Returning generally to FIGS. 3 and 4, the bolt 14 and nut 18 are shown in a preinstalled position relative to each other. With the blind fastener 10 in the preinstalled position and extending through the first and second workpieces 26, 30, as shown in FIGS. 3 and 4, the second end surface 250 of the nut head 214 is flush with or recessed from the first front surface 34. The sleeve 210 has an axial length that is longer than a maximum grip length of the first and second workpieces 26, 30, so that the sleeve 210 is received through the aperture 50 and extends from the second back surface 46.

In this position, the first socket 314 of the tool 310 can mate with and engage the first tool engagement portion 150 and the second socket 330 of the tool 310 can mate with and engage the second tool engagement portion 266. The tool 310 is then operated in a first mode such that the first socket 314 transmits torque to the bolt 14 in the tightening direction of the threads 126, 234, while the second socket 330 holds the nut 18 rotationally stationary relative to the work pieces 26, 30. The tool 310 inhibits the bolt 14 and nut 18 from moving axially away from the workpieces 26, 30.

Figure 5:
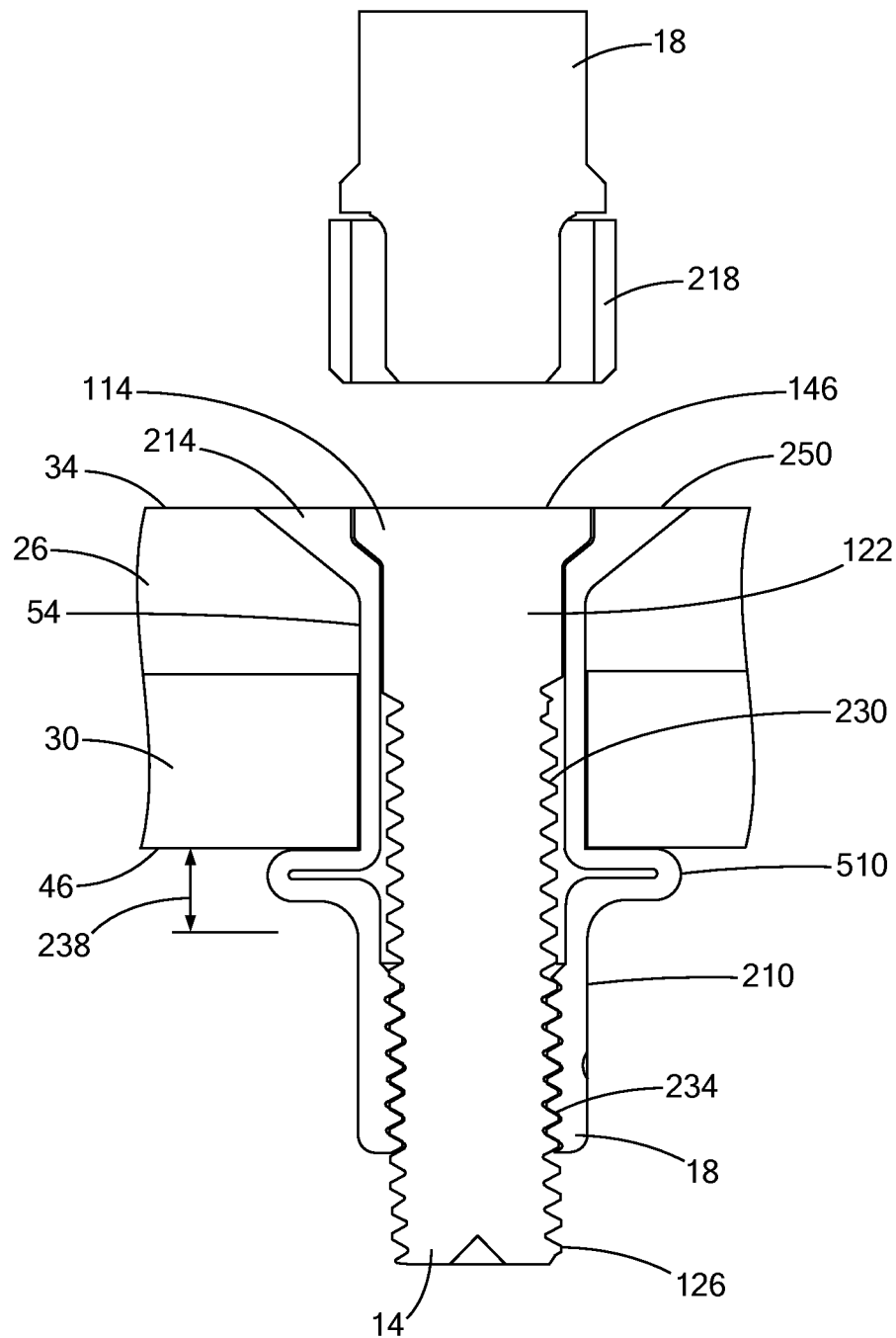
FIG. 5 is a cross-sectional view of the blind fastener of FIG. 1 in an installed position, illustrating the blind fastener installed relative to the set of workpieces.

With continued reference to FIG. 3 and additional reference to FIG. 5, the threads 126, 234 impart an axial force on the sleeve 210 to move the terminal end 222 of the sleeve 210 toward the work pieces 26, 30, causing the ductile region 238 of the sleeve 210 to deform radially outwards to form a bulb 510. The bulb 510 contacts the second back surface 46 and can impart a force thereon that biases the second workpiece 30 toward the first workpiece 26. Thus, the first and second workpieces 26, 30 are clamped between the nut head 214 and the bulb 510.

Once the bulb 510 is formed, the bulb 510 and sleeve 210 can resist further deformation. Additional torque applied to the bolt 14 above a predetermined torque threshold value can then cause the first frangible portion 154 to break. More specifically, the lug 118 is rotated in the tightening direction while the nut 18 is held rotationally and axially stationary. The threads 126, 234 impart an axial force on the sleeve 210 until the shear strength of the break-neck 174 is exceeded. The break-neck 174 then shears, separating the lug 118 from the bolt head 114. The shearing of the break-neck 174 leaves the first end surface 146 of the bolt head 114 flush with or slightly recessed from the second end surface 250 of the nut head 214, as shown in FIG. 5.

The clamping force of the bulb 510 and the nut head 214 on the workpieces 26, 30 can resist rotation of the nut 18 relative to the workpieces 26, 30. The second socket 330 then applies torque to the handling member 218 in an amount that exceeds a predetermined torque threshold value to cause the second frangible portion 270 to break. More specifically, the second frangible portion 270 shears at the break-neck 276, separating the handling member 218 from the nut head 214. The shearing of the second frangible portion 270 leaves the second end surface 250 of the nut head 214 flush with or recessed from the first front surface 34 of the first workpiece 26, as shown in FIG. 5. In the example provided, since the retainer lip 158 has a greater diameter than the second bore 274, the lug 118 cannot fall axially through the second bore 274. Thus, the lug 118 can be removed with the second handling member 218.

Figure 6:
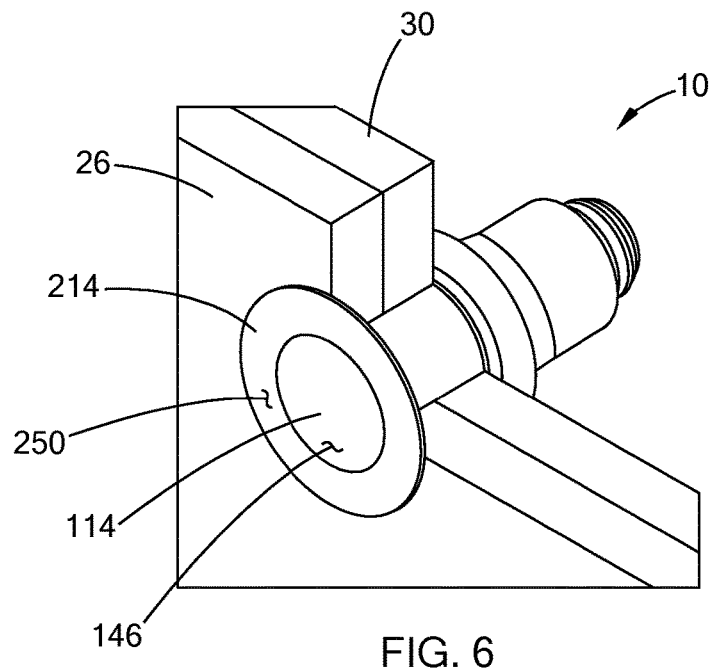
FIG. 6 is a perspective view of the blind fastener of FIG. 5, illustrating the set of workpieces partially cut-away.
Figure 7:
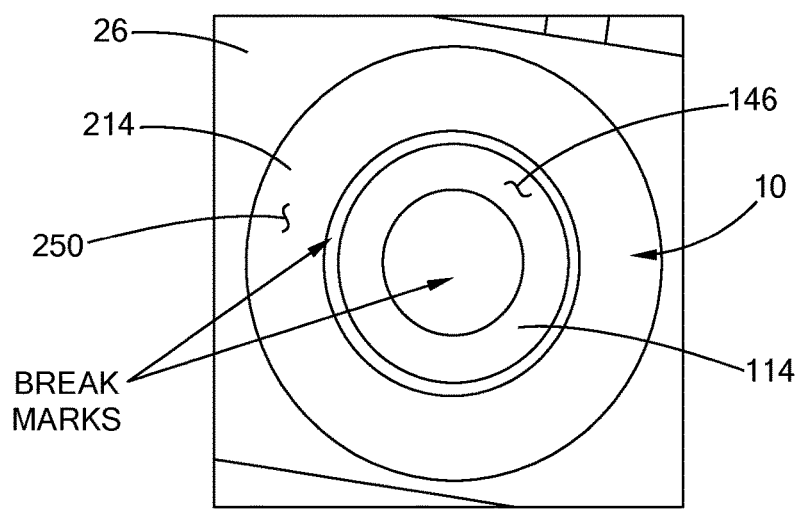
FIG. 7 is a top view of the blind fastener of FIG. 6.

Thus, as shown in FIGS. 6 and 7, the blind fastener 10 can be easily installed and while being flush with the first workpiece 26 when in the fully installed position without the need for further machining or processing.

Tool

Figure 8:
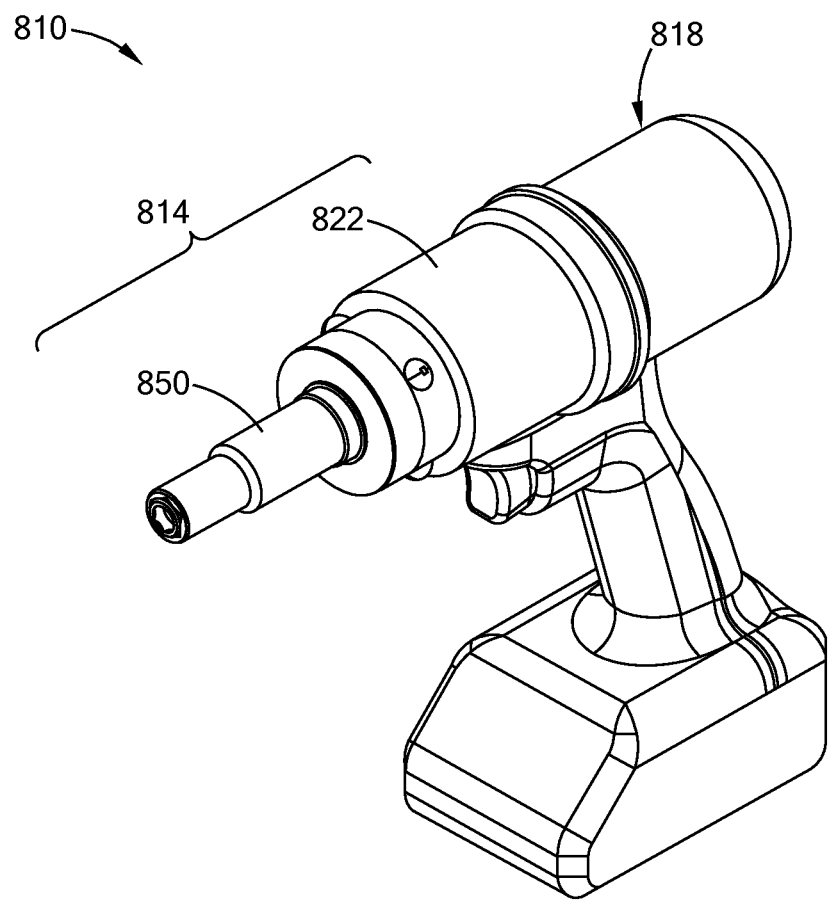
FIG. 8 is a perspective view of a tool for installing a blind fastener in accordance with the teachings of the present disclosure.

Referring to FIG. 8 a tool 810 for installing a blind fastener such as the blind fastener 10 (FIGS. 1-7) is illustrated. The tool 810 and its operation can be similar to the tools of co-pending and commonly owned U.S. patent application Ser. No. 16/203,535 (U.S. Pub. No. 2019/0160520, the entire disclosure of which is incorporated herein by reference), except as otherwise shown or described herein. The tool 810 includes a nose 814 and a driver 818 drivingly coupled to the nose 814. In the example provided, the driver 818 is an electric hand-held nut-runner. In an alternative configuration, not shown, the driver 818 can be any suitable type of drive mechanism configured to drive the nose 814, such as a pneumatic drive mechanism or an end-effector of a robotic arm for example.

Figure 9:
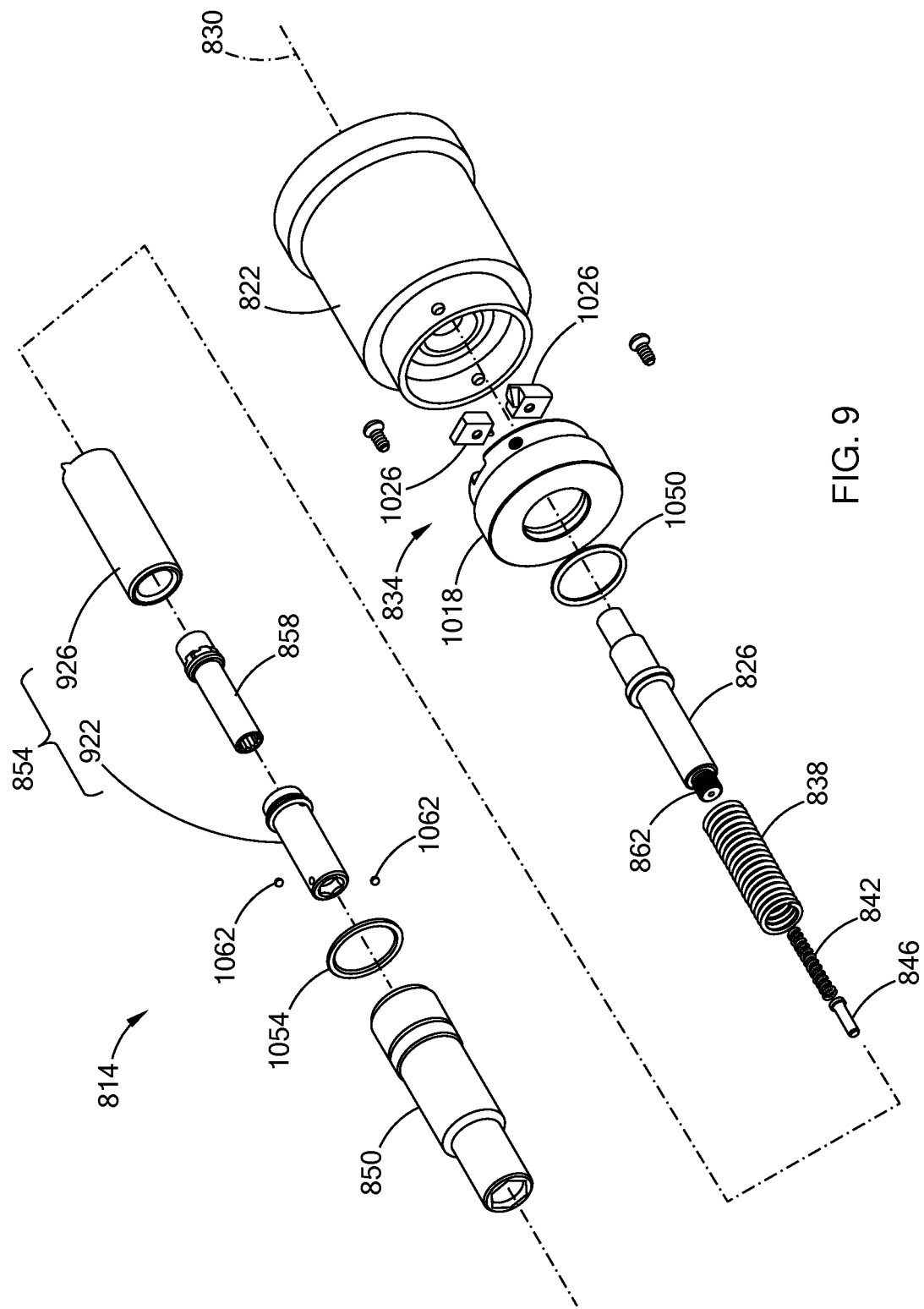
FIG. 9 is an exploded perspective view of a nose of the tool of FIG. 8.
Figure 10:
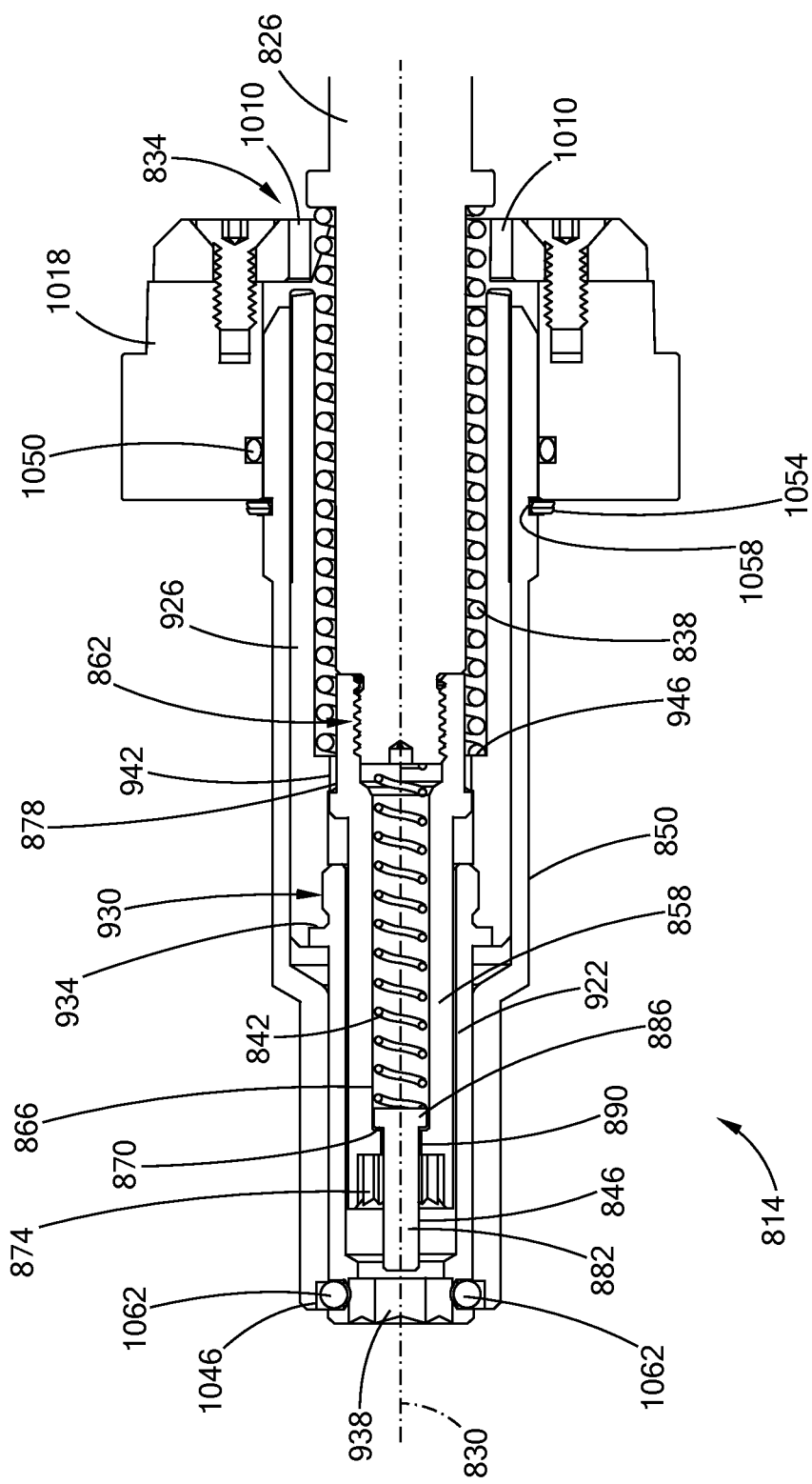
FIG. 10 is a cross-sectional view of the nose of the tool of FIG. 8.

With additional reference to FIGS. 9 and 10, the driver 818 includes a gearbox 822 and a drive shaft 826. The gearbox 822 receives input torque from a motor (not specifically shown) of the driver 818 and outputs torque to the drive shaft 826 to rotate the drive shaft 826 about an axis 830. The nose 814 includes a clutch 834, a first spring 838, a second spring 842, an ejector pin 846, a retainer sleeve 850, a nosepiece 854, and a collet 858. The collet 858 is coaxial with the axis 830 and coupled to the drive shaft 826 for common rotation. In the example provided, the collet 858 is coupled to the drive shaft 826 by a set of mating threads 862.

Referring to FIG. 10, the collet 858 defines a spring chamber 866, a stop 870, a first socket 874 (e.g., the first socket 314 of FIG. 3) and a nut 878. The first socket 874 can have an internal shape configured to mate with the tool engagement portion 150 of the bolt 14. The ejector pin 846 has a shaft 882 and a head 886 and is coaxial with the axis 830. The shaft 882 is configured to extend through an aperture 890 defined by the stop 870 and axially between the first socket 874 and the spring chamber 866. The head 886 is slidably received in the spring chamber 866 and has a diameter that is greater than the aperture 890. The second spring 842 is disposed within the spring chamber 866 and configured to bias the ejector pin 846 toward a forward position in which the head 886 abuts the stop 870.

Figure 11:
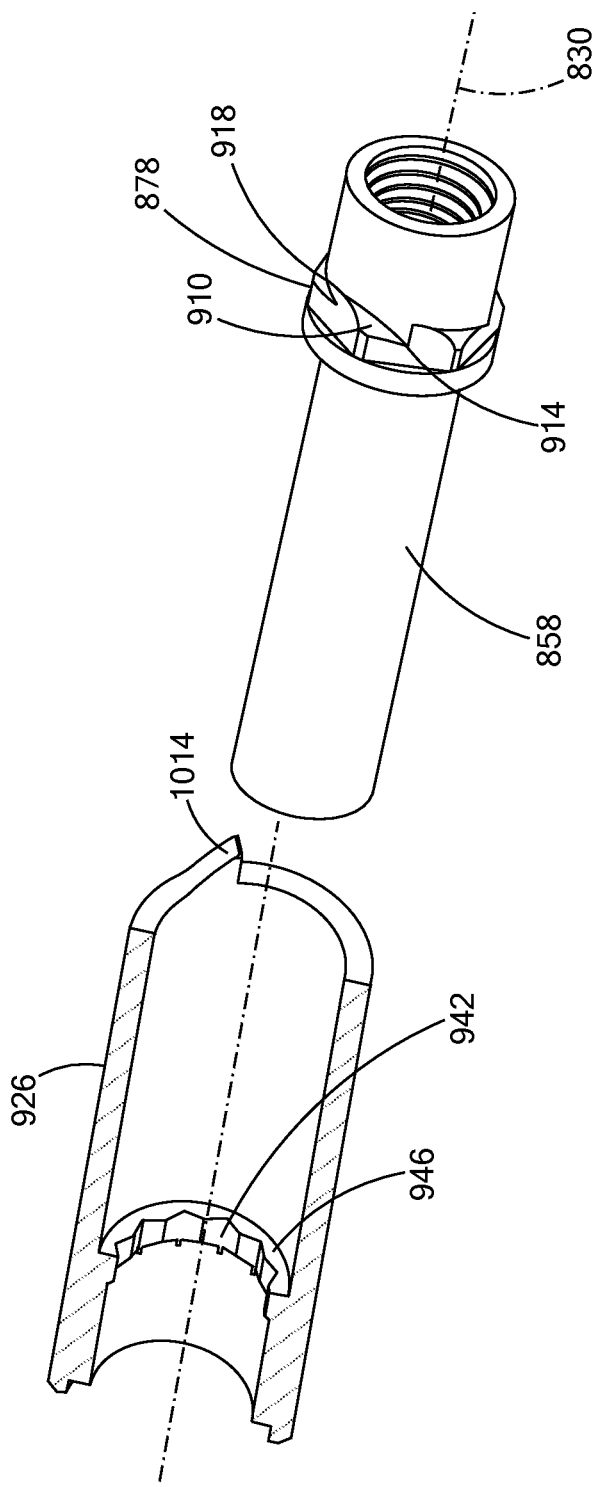
FIG. 11 is a perspective view of a collet and a portion of a nosepiece of the tool of FIG. 8, illustrating a cross-section of the portion of the nosepiece.

Referring to FIG. 11, the nut 878 of the collet 858 is a generally hexagonal shape, though other configurations can be used. In the example provided, the nut 878 includes angular or helical lead-in ramps 910 that angle from the rear side of each point of the hex shape, downward toward the cylindrical surface. The lead-in ramps 910 are also angled axially. In other words, each lead-in ramp 910 can have a leading portion 914 and a trailing portion 918 with the leading portion 914 being axially forward of the trailing portion 918 and ramps radially outward until meeting the rest of the hexagonal feature (e.g., the hex-flats or the point). These ramps 910 can aid in rapid engagement of the mating nut 878 with a mating socket without the need for perfect alignment of the two features.

Referring to FIG. 10, the nosepiece 854 is disposed about the axis 830. In the example provided, the nosepiece 854 includes a forward nose member 922 and a rear nose member 926 coupled together for common rotation about the axis 830 by mating threads 930 (shown in FIG. 10), though other configurations can be used. In the example provided, the mating threads 930 are left-handed threads. The rearward end of the forward nose member 922 is coupled to the forward end of the rear nose member 926 by the threads 930 and a lip 934 on the forward nose member 922 can abut the rear nose member 926 when fully threaded together.

The forward nose member 922 is disposed about the collet 858. The rear nose member 926 is disposed about the collet 858 and the drive shaft 826. The forward end of the forward nose member 922 defines a second socket 938 (e.g., the second socket 318 of FIG. 3) configured to engage the handling member 218 (FIG. 3) of the nut 18 (FIG. 3). Referring to FIGS. 10 and 11, the forward end of the rear nose member 926 defines an internal socket 942 and a spring seat 946. The internal socket 942 is configured to engage the nut 878 that is defined by the exterior of the collet 858. The first spring 838 is coaxial with the axis 830 and disposed radially between the drive shaft 826 and the rear end of the rear nose member 926. One end of the first spring 838 is seated against the spring seat 946 to bias the nosepiece 854 toward an extended position in which the socket 942 engages the nut 878 of the collet 858.

Figure 12:
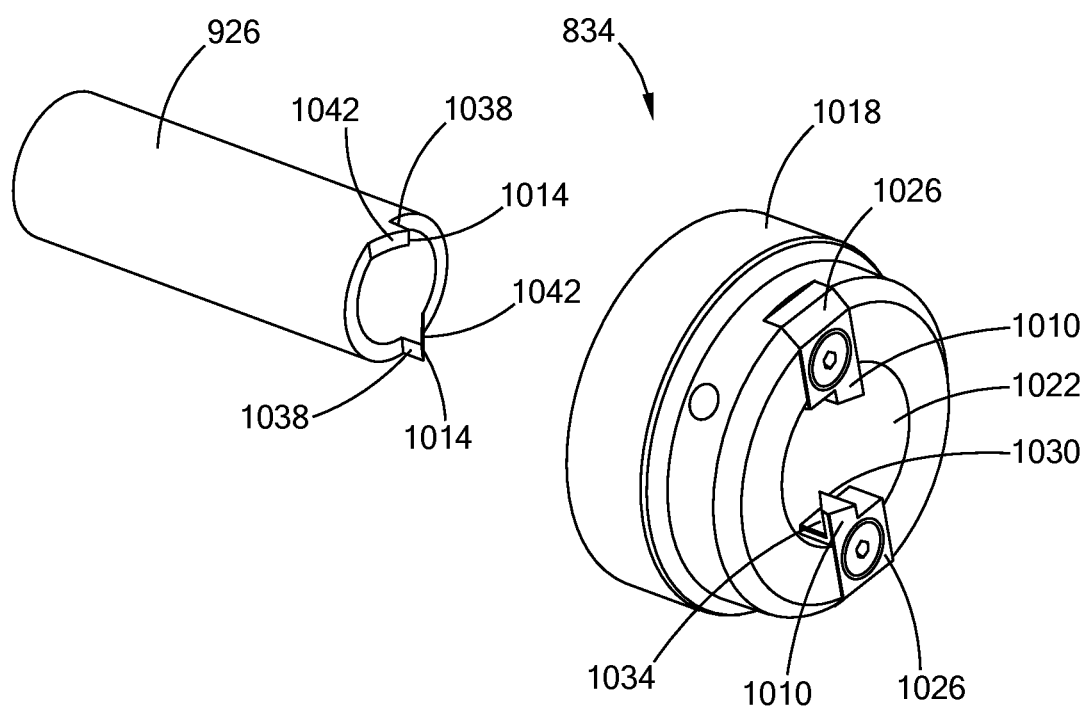
FIG. 12 is a perspective view of a clutch of the tool of FIG. 8.

Referring to FIG. 12, the clutch 834 includes a plurality of stationary lugs 1010 and a plurality of rotary lugs 1014. The stationary lugs 1010 are fixed relative to the gearbox 822 while the rotary lugs 1014 extend from a rearward end of rear nose member 926 of the nosepiece 854. In the example provided, the clutch 834 includes an annular body 1018 that is fixedly mounted to the gearbox 822 and each stationary lug 1010 extends radially inward into the central bore 1022 of the annular body 1018. In the example provided, each stationary lug 1010 is defined by a corresponding lug block 1026 that is mounted to the annular body 1018, though other configurations can be used.

In the example provided, each stationary lug 1010 has a flat face 1030 and an angled face 1034 and each rotary lug 1014 has a corresponding flat face 1038 and a corresponding angled face 1042. The rear end of the rear member of the nosepiece 854 extends into the central bore 1022 of the annular body 1018. The nosepiece 854 is axially movable relative to the stationary lugs 1010 between the extended position and a retracted position. In the extended position, the rotary lugs 1014 are disengaged from the stationary lugs 1010 and the nosepiece 854 is free to rotate relative to the annular body 1018. As described above, the socket 942 can also be engaged with the nut 878 of the collet 858 in this extended position. In the retracted position, rotation of the nosepiece 854 in the clockwise direction (as viewed in FIG. 12) causes the flat faces 1038 of the rotary lugs 1014 to engage the flat faces 1030 of the stationary lugs 1010 to inhibit rotation of the nosepiece 854, while rotation in the counter-clockwise direction (as viewed in FIG. 12) causes the angled faces 1042 of the rotary lugs 1014 to engage the angled faces 1034 of the stationary lugs 1010 which can cause the nosepiece to move axially in the direction toward the extended position until the rotary lugs 1014 and stationary lugs 1010 disengage. When in the retracted position, the socket 942 is disengaged from the nut 878 of the collet 858.

Figure 13:
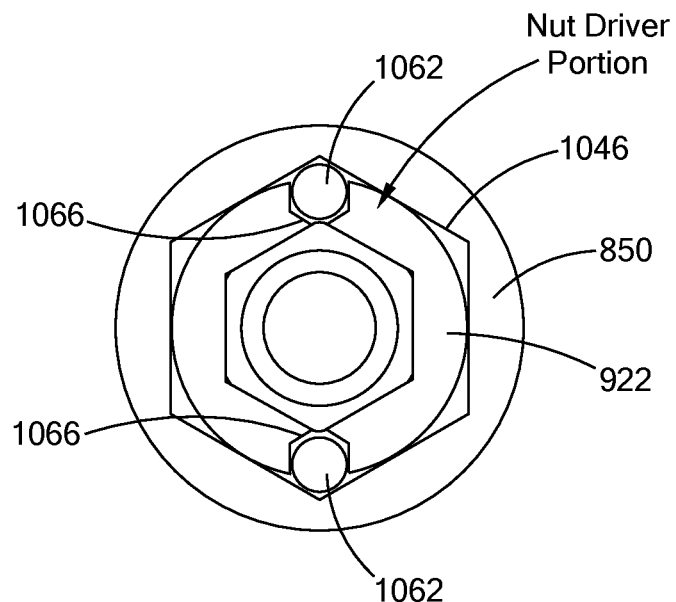
FIG. 13 is a front view of the nose of the tool of FIG. 8, illustrating the tool in a resting condition.
Figure 14:
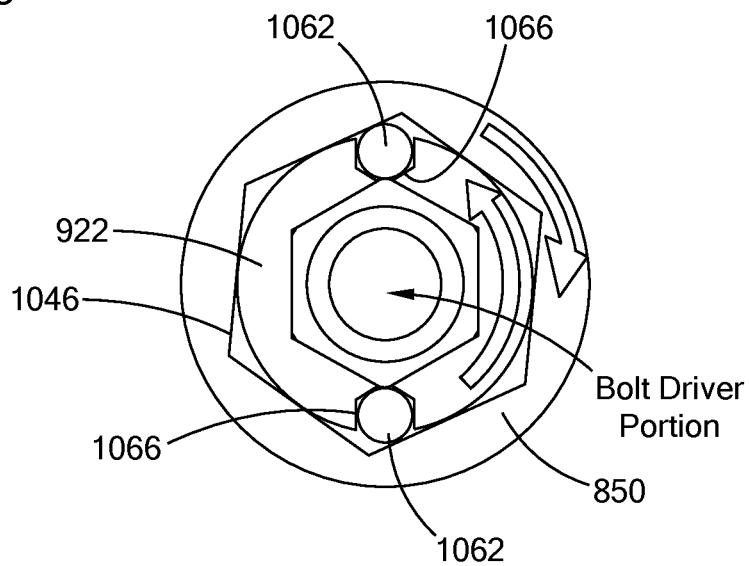
FIG. 14 is front view similar to FIG. 11, illustrating the tool in an operating condition.

Referring to FIGS. 10 and 13-16, the retainer sleeve 850 is disposed about the nosepiece 854 and the forward end of the retainer sleeve 850 defines a socket 1046. The rearward end of the retainer sleeve 850 is received in the central bore 1022 of the annular body 1018. In the example provided, an O-ring 1050 is disposed within the central bore 1022 and provides friction that resists rotation of the retainer sleeve 850 relative to the annular body 1018. In the example provided, the retainer sleeve 850 is prevented from moving axially in the rearward direction by a retainer ring 1054 received in a groove 1058 of retainer sleeve 850, though other configurations can be used. A plurality of balls 1062 are disposed in the socket 1046 of the retainer sleeve 850. Each ball 1062 is positioned within a corresponding recess 1066 defined in an outer surface of the nosepiece 854. Each recess 1066 is open through a corner of the second socket 938 such that the corners of the handling member 218 of the nut 18 (e.g., the corners of the hexagonal shape) can extend into the recess 1066. Referring to FIG. 13, when the nosepiece 854 is not rotating about the axis 830, the balls 1062 fit within the corners of the socket 1046 with clearance relative to the corners of the handling member 218 of the nut 18. Referring to FIG. 14, when the nosepiece 854 rotates, rotation of the retainer sleeve 850 is resisted by the O-ring 1050 (FIGS. 9 and 10) and the nosepiece 854 rotates the balls 1062 and the socket 1046 acts as a cam that forces the balls 1062, which act as followers, radially inward into contact with the handling member 218 of the nut 18. In an alternative form, not shown, one ball 1062 may be used or more than two balls 1062 may be used. In another alternative form, not shown, a shape other than a spherical ball may be used as a follower (e.g., a cylindrical roller).

Figure 15:
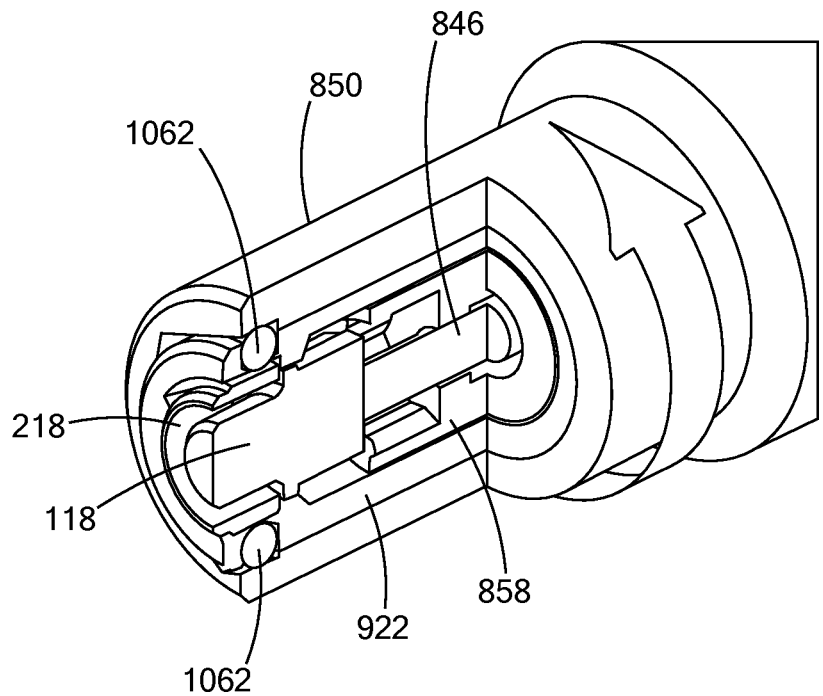
FIG. 15 is a perspective partial cross-sectional view of the nose of the tool of FIG. 8 in the operating condition.
Figure 16:
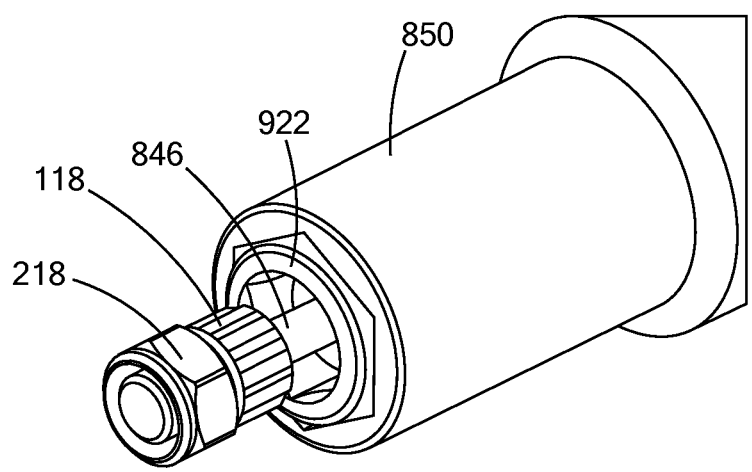
FIG. 16 is a perspective view of the nose of the tool of FIG. 8 in the resting condition.

Referring to FIGS. 15 and 16, the radially inward pressure of the balls 1062 on the handling member 218 of the nut 18 resists axial movement of the handling member 218 relative to the nosepiece 854 and is sufficient to overcome the biasing force of the second spring 842 that biases the ejector pin 846 forward. Since the retaining lip 158 overlaps with the handling member 218 of the nut 18, both the lug 118 and the handling member 218 of the nut 18 are retained while the nosepiece 854 rotates. When the nosepiece 854 stops rotating, the balls 1062 release the handling member 218 of the nut 18 and the second spring 842 pushes the ejector pin 846 forward, which pushes the lug 118 and handling member 218 of the nut 18 forward and out of the tool 810.

It should be noted that the disclosure is not limited to the form described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

As used herein, the phrase at least one of A, B, and C should be construed to mean a logical (A OR B OR C), using a non-exclusive logical OR, and should not be construed to mean "at least one of" A, at least one of B, and at least one of C.

Unless otherwise expressly indicated, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

The terminology used herein is for the purpose of describing particular example forms only and is not intended to be limiting. The singular forms "a," "an," and "the" may be intended to include the plural forms as well, unless the context clearly indicates otherwise. The terms "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, examples that do not depart from the substance of the disclosure are intended to be within the scope of the disclosure. Such examples are not to be regarded as a departure from the spirit and scope of the disclosure. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A blind fastener for connecting a plurality of workpieces, comprising:
   a bolt including a shaft, a bolt head, and a lug, the bolt head being disposed between the shaft and the lug and extending radially outward from the shaft, an end of the shaft opposite the bolt head defining external threads, the lug including a first tool engagement portion and a first frangible portion that frangibly couples the lug to the bolt head; and
   a nut including a sleeve, a nut head, and a handling member, the sleeve including a central bore configured to receive the shaft and defining internal threads configured to mate with the external threads, the nut head being disposed between the handling member and the sleeve, the nut head extending radially outward from the sleeve and defining a recess configured to receive the bolt head, the handling member being configured to surround at least a portion of the lug, the handling member including a second frangible portion and a second tool engagement portion, the second frangible portion frangibly coupling the second tool engagement portion to the nut head,
   wherein the lug includes a retaining lip and the handling member defines a bore having a diameter that is less than a diameter of the retaining lip.

2. The blind fastener of claim 1, wherein an end surface of the bolt head is flush with or recessed from an end surface of the nut head when the bolt is fully threaded into the nut.

3. The blind fastener according to claim 1, wherein the first frangible portion is configured to break off from the bolt head such that an end surface of the bolt head is flush with or recessed from a front surface of the plurality of workpieces, and the second frangible portion is configured to break off from the nut head such that an end surface of the nut head is flush with or recessed from the front surface.

4. The blind fastener according to claim 1, wherein the first tool engagement portion includes lead-in ramps.

5. The blind fastener according to claim 1, wherein the second tool engagement portion includes lead-in ramps.

6. The blind fastener according to claim 1, wherein the second frangible portion is entirely radially inward of an outermost perimeter of the nut head.

7. The blind fastener according to claim 1, wherein the handling member defines a bore having a diameter equal to an outermost diameter of the recess.

8. The blind fastener according to claim 1, wherein the retaining lip extends radially outward of the first tool engagement portion.

9. The blind fastener according to claim 8, wherein the handling member is entirely radially outward of the first tool engagement portion.

10. The blind fastener according to claim 1, wherein the blind fastener consists of two pieces when in a pre-installed condition, the bolt being a first one of the two pieces and the nut being a second one of the two pieces.

11. The blind fastener of claim 1, wherein the second frangible portion defines a break-neck that extends around a full circumference of the nut.

12. The blind fastener of claim 1, wherein the first frangible portion includes a break-neck that extends around a full circumference of the bolt.

13. The blind fastener of claim 1, wherein when the blind fastener is in a pre-installed condition, the sleeve includes a ductile zone that has a hardness that is less than a hardness of the nut head, a portion of the sleeve between the ductile zone and the nut head, and a portion of the sleeve at the internal threads.

14. The blind fastener of claim 1, wherein when the blind fastener is in a pre-installed condition, the sleeve includes a variable annealed zone that has a hardness that is less than a hardness of the nut head and less than a hardness of the portion including the internal threads.

\* \* \* \* \*